United States Patent [19]
Ashcroft et al.

[11] Patent Number: 6,051,777
[45] Date of Patent: *Apr. 18, 2000

[54] DOUBLE OPPOSITE-END TUBESHEET DESIGN FOR A THERMOVOLTAIC ENERGY CONVERTER

[75] Inventors: John M. Ashcroft; Brian C. Campbell, both of Scotia; David M. Depoy, Clifton Park, all of N.Y.

[73] Assignee: The United States of America as represented by the United States Department of Energy, Washington, D.C.

[*] Notice: This patent is subject to a terminal disclaimer.

[21] Appl. No.: 08/873,296

[22] Filed: Jun. 11, 1997

[51] Int. Cl.[7] ................................................. H01L 31/058
[52] U.S. Cl. ............................................. 136/253; 136/206
[58] Field of Search ..................... 136/206, 253, 136/240

[56] References Cited

U.S. PATENT DOCUMENTS

| | | | |
|---|---|---|---|
| 4,750,943 | 6/1988 | Nelson | 136/253 |
| 4,776,895 | 10/1988 | Goldstein et al. | 136/253 |
| 5,124,610 | 6/1992 | Conley et al. | 310/303 |
| 5,137,583 | 8/1992 | Parent et al. | 136/253 |
| 5,356,487 | 10/1994 | Goldstein et al. | 136/253 |
| 5,360,490 | 11/1994 | Nelson | 136/253 |
| 5,512,108 | 4/1996 | Noreen | 136/253 |
| 5,512,109 | 4/1996 | Fraas et al. | 136/253 |
| 5,560,783 | 10/1996 | Hamlen | 136/253 |
| 5,616,186 | 4/1997 | Fraas et al. | 136/253 |
| 5,711,661 | 1/1998 | Kushch et al. | 431/329 |
| 5,772,793 | 6/1998 | Ashcroft et al. | 136/253 |
| 5,797,997 | 8/1998 | Noreen | 136/253 |

*Primary Examiner*—Nam Nguyen
*Assistant Examiner*—Michael C. Miggins
*Attorney, Agent, or Firm*—Virginia B. Caress; William R. Moser; Paul A. Gottlieb

[57] ABSTRACT

A method and apparatus for the direct conversion of energy by thermovoltaic energy conversion having first and second tubesheets, at least one photon emitter plate secured to and extending from the first tubesheet, at least one cold plate secured to and extending from the second tubesheet, a plurality of thermovoltaic cells disposed along oppositely disposed exterior surfaces of the cold plate, and means cooperating with the tubesheet for maintaining a vacuum between the photon emitter plate and the cold plate.

16 Claims, 4 Drawing Sheets

DOUBLE OPPOSITE-END TUBESHEET DESIGN FOR A THERMOVOLTAIC ENERGY CONVERTER

GOVERNMENT SUPPORT

This invention was made with government support under contract number DE-AC1276SN00052 awarded by the Department of Energy. The Government may have certain rights in this invention.

FIELD OF THE INVENTION

This invention relates generally to the field of direct energy conversion. In particular, this invention relates to a method and apparatus for the direct conversion by thermovoltaic energy conversion of photon energy into electricity.

BACKGROUND OF THE INVENTION

In the past, there have been different types of energy conversion methods. Many of these methods are traditional turbo-machinery-based energy conversion methods, such as exemplified by the Rankine or Brayton cycles. These energy conversion methods have encountered problems with wear of moving parts within the generator. Moving parts often become worn and require replacement.

There have been several alternatives to the more traditional turbo-machinery-based energy conversion methods. For instance, photovoltaic converters have been used to convert solar radiation directly into electrical energy. Photovoltaic converters are solar cells which convert a fraction of the incident solar radiation directly into electrical energy. Solar cells are used in a wide range of applications, from low to medium-scale systems for power generation.

Like solar cells, thermovoltaic (TV) energy conversion eliminates the use of moving parts within the generator. TV power production is based upon positioning semiconducting TV "cells" (similar to solar cells) in the photon flux field of a high temperature photon emitter. TV energy conversion has been contemplated at temperatures above 2,000° F., where the photon energy spectrum is high. TV energy conversion at temperatures below 2000° F. has received little attention. This lack of attention can be attributed to the lack of quality semiconducting materials which can take advantage of the relatively low energy photon spectrum emitted by a "low" temperature heat source. Recently, TV cells which are "tuned" to the lower energy, longer wavelength photon spectrum of the emitter have been fabricated. Thus, there is need in the art for a TV energy converter which can convert the photon energy in the lower energy photon spectrum into electricity.

SUMMARY OF THE INVENTION

A principal object of the present invention is to provide a method and apparatus for the conversion of photon energy to electricity by utilizing thermovoltaic cells.

The above object is achieved according to the present invention. A thermovoltaic power generator includes first and second spaced tubesheets, with at least one photon emitter plate secured to and extending from the first tubesheet. At least one cold plate is secured to and extends from the second tubesheet, with the cold plate extending parallel to the photon emitter plate. A plurality of thermovoltaic cells are disposed along oppositely disposed exterior surfaces of the cold plate. A vacuum can be formed in the space between the photon emitter plate and the cold plate.

A method of using infrared photon energy to create electricity comprises the steps of positioning a plurality of semiconducting thermovoltaic cells on oppositely disposed exterior surfaces of a cold plate. A photon flux field is generated. The cold plate is cooled, and photon energy impinging on the thermovoltaic cells is converted into electricity.

These and other objects and advantages of the invention will be readily apparent in view of the following description and drawings of the above-identified invention.

BRIEF DESCRIPTION OF THE DRAWINGS

The above and other objects and advantages and novel features will become apparent from the detailed description of the preferred embodiment of the invention illustrated in the accompanying drawings, wherein.

DETAILED DESCRIPTION OF THE PREFERRED EMBODIMENT

TV power production is based upon positioning semiconducting TV cells in the photon flux field of a relatively low temperature photon emitter. The emitter may be heated by high temperature gas flowing within it. The TV cells convert a fraction of the incident photon energy into electricity. The photon energy that is not converted to electricity either reflects back to the emitter, to maintain high system efficiencies, or passes through the cells and into a heat sink on which the cells are mounted.

Figure 1:
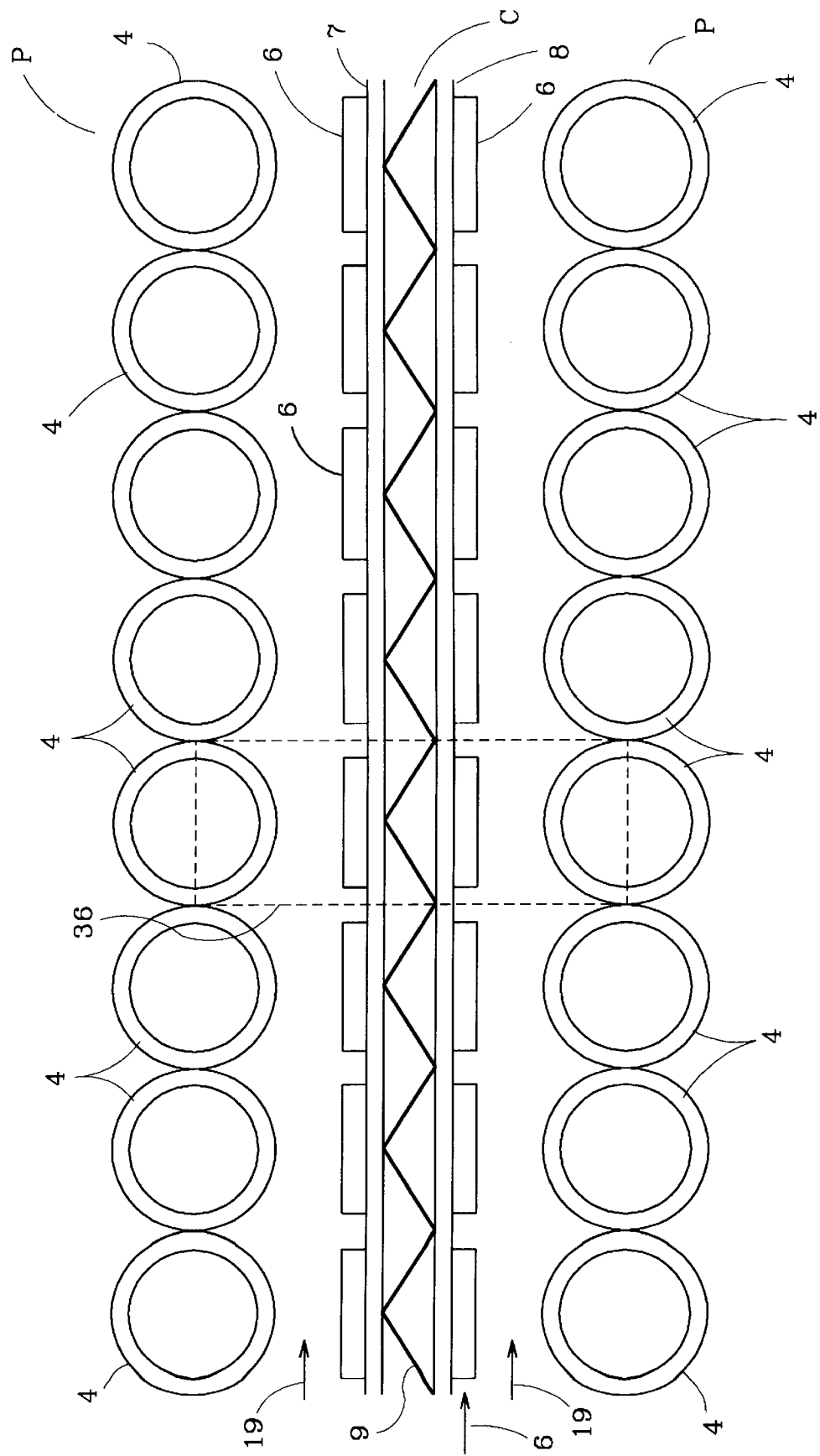
FIG. 1 is a cross-sectional view of a TV generator "unit module"

As best illustrated in FIG. 1, photon emitter plates P, which are each comprised of a plurality of emitter tubes 4, are positioned above and below cold plate C, to surround cold plate C and affixed TV cells 6. TV cells 6 are disposed on the top surface 7 and the bottom surface 8 of cold plate C. Heating of emitter plates P causes photons to be emitted by tubes 4, with the result that some of the photons impact cold plate C and TV cells 6. TV cells 6 convert a fraction of the incident photon energy into electricity. The emitter plates P, cold plate C, and TV cells 6 of FIG. 1 provide a unit module which may be utilized in any convenient number to provide an electricity generator.

TV cells 6 operate best when cooled. Efficiency is very sensitive to cell temperature. Efficiency will become prohibitively low for cells operating above 200° F. It is desirable to remove waste heat from the heat sink of the TV cell. For this reason, water channel 9 is disposed within cold plate C for supplying coolant flow 10 (FIG. 2) to cold plate C. The coolant flow 10 maintains TV cells 6 at a relatively low temperature, to enhance efficient functioning of the cells. Likewise, a heated flow 11 (FIG. 2) is disposed within photon emitter plates P to heat emitter plates P, generating the requisite photon energy.

Figure 2:
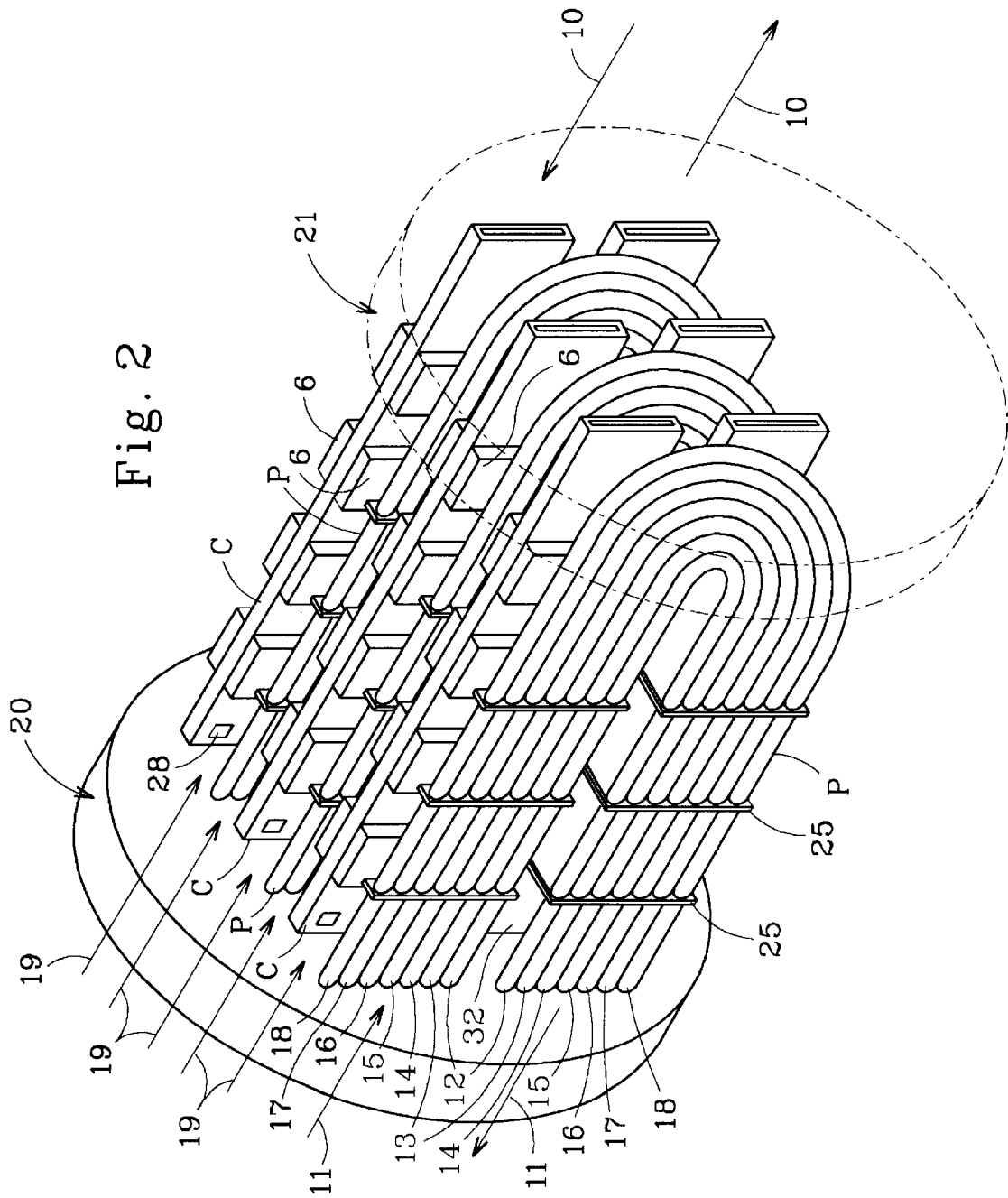
FIG. 2 is a perspective view of a TV generator according to the invention.

In addition, the outside surfaces 7 and 8 of cold plate C preferably are flat, as best shown in FIG. 1, in order to permit TV cells 6 to be affixed thereto. Emitter plates P can have a scallop-shaped appearance, which results from a row of in-line emitter tubes 4. FIG. 2 illustrates a plurality of unit modules, with the emitter plates P formed by in-line tubes 4. Innermost tube 12 is U-shaped in the plane and circular in cross section. Tubes 13, 14, 15, 16, 17, and 18 nest about tube 12, and likewise are U-shaped and circular in cross section. As best illustrated in FIGS. 1 and 2, the nested arrangement of emitter tubes of photon emitter plates P produces a scallop-shaped appearance. The scallop-shape increases the radiant flux of emitter plates P.

In order to minimize total converter volume, photon emitter plates P and the relatively cold TV cells 6 should be closely packed. Photon emitter plates P are separated from TV cells 6 by a thin evacuated gap 19. A strong vacuum preferably is maintained within gap 19 to minimize conductive and convective heat transfer between photon emitter plates P and TV cells 6. These other modes of heat transfer increase cell temperature and reduce efficiency, while producing no useful energy. Photon emitter plates P preferably are operated at temperatures of between 1,000 and 2,000° F. This temperature range is common for many industrial applications, such as achieved in coal or gas fired power plants.

Prior photon emitters have had an operating temperature of 2,000° F. and above, whereas low temperature emitters have produced a low energy photon spectrum. TV cells have recently been fabricated at the National Renewable Energy Laboratory (NREL) and the Jet Propulsion Laboratory (JPL) which are "tuned" to the lower energy, longer wave length photon spectrum of emitter plates P. The tuned TV cells may thus be used with the low temperature emitter of the invention.

Another important aspect of TV conversion is spectral control. Even with TV cells tuned to a low energy spectrum, many of the emitted photons do not have sufficient energy to create charge carriers, and thereby electricity, in the cells. In order to maintain high system efficiency, these low energy photons should be reflected back to the emitter or, alternatively, never emitted. Thus, a satisfactory TV cell should take into account spectral control.

Figure 3:
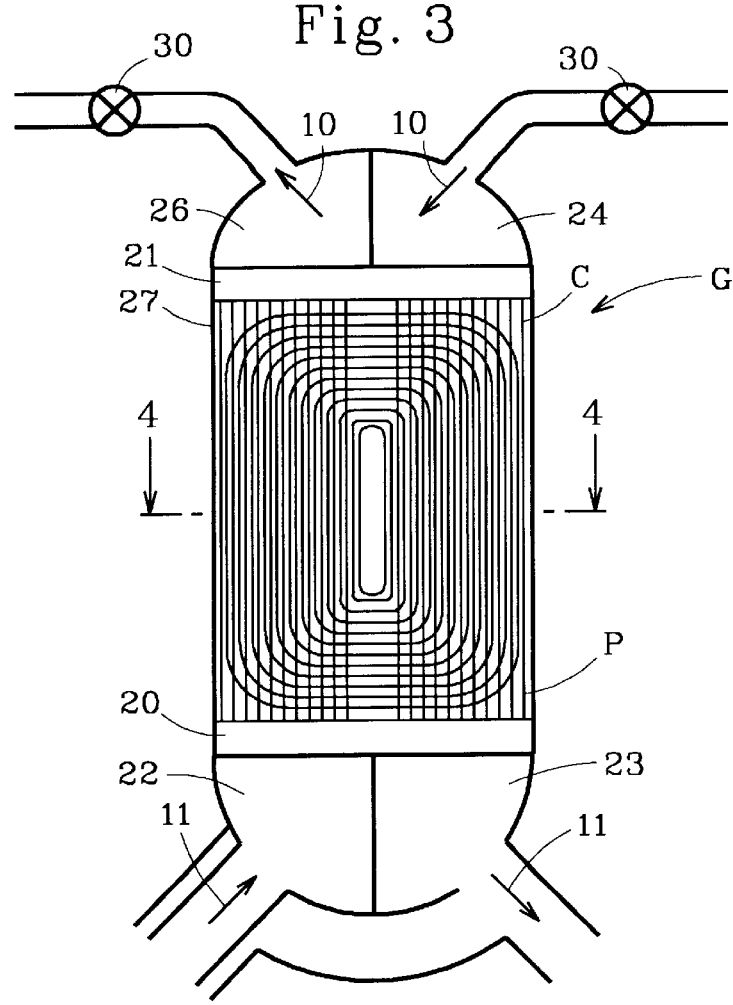
FIG. 3 is an elevational view of the TV generator with portions broken away.
Figure 5:
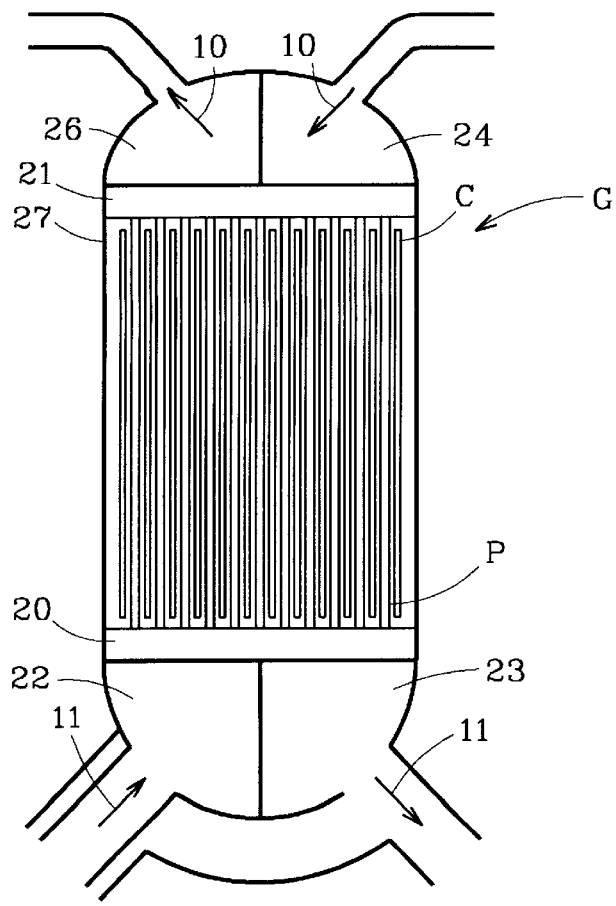
FIG. 5 is an elevational view of the TV generator with portions broken away.

Referring to FIGS. 2, 3, and 5, photon emitter plates P and cold plates C with affixed TV cells 6 are stacked alternatingly within a right cylindrical generator G. Photon emitter plates P are cantilevered off tubesheet 20. Cold plates C are likewise cantilevered off tubesheet 21. Hot gas flows within photon emitter plates P through in-line U-shaped tubes 12, 13, 14, 15, 16, 17, and 18. In-line tubes 12, 13, 14, 15, 16, 17, and 18 of emitter plates P are secured together by a plurality of brackets 25. Heated flow 11, such as hot gas from a power plant, enters the generator G through plenum 22, travels through tubesheet 20 and photon emitter plates P to heat the plates, and exits through an adjacent plenum 23, which is shown specifically with reference to FIGS. 3 and 5. Similarly, coolant 10 flows through plenum 24, travels through cold plates C to cool the cold plates C, and exits through an adjacent outlet plenum 26. The area between the tube sheets 20 and 21 is surrounded by a sealed shell 27 which maintains the required vacuum.

The disclosed invention addresses the many diverse thermal and structural constraints involved in designing and building a TV converter. The invention allows for entry and exit of hot gasses to heat the emitters, and the entry and exit of cooling water or other coolant to maintain low TV cell temperatures.

An important advantage of the disclosed invention is that it allows photon emitter plates P to expand without adverse effects on the structural integrity of the generator. As photon emitter plates P are heated to emitter operating temperatures, they will expand along their length and width by as much as 0.5 inches. Constraining this expansion may create unacceptably high stresses within the thin emitter plates P. In the disclosed design, since the emitter plates P and the cold plates C are not rigidly connected to each other, then the emitter plates P are free to expand along their length and width. Emitter tubesheet 20 will also expand as it is heated, changing evacuated gap 19 between the alternate emitter plates P and cold plates C. The rows of alternating emitter plates P and cold plates C, usually with a separation between 0.01 and 0.30 inches, are tightly spaced. This could cause the alternating emitter plates P and cold plates C to contact each other as the emitter plates P expand. However, cold plates C are very pliant near tubesheet 20 and will therefore move with photon emitter plates P. Small slider type spacers 28 (FIG. 2), attached to cold plate C, maintain plate spacing and minimize conductive heat transfer between the emitter plates P and cold plates C.

Figure 6:
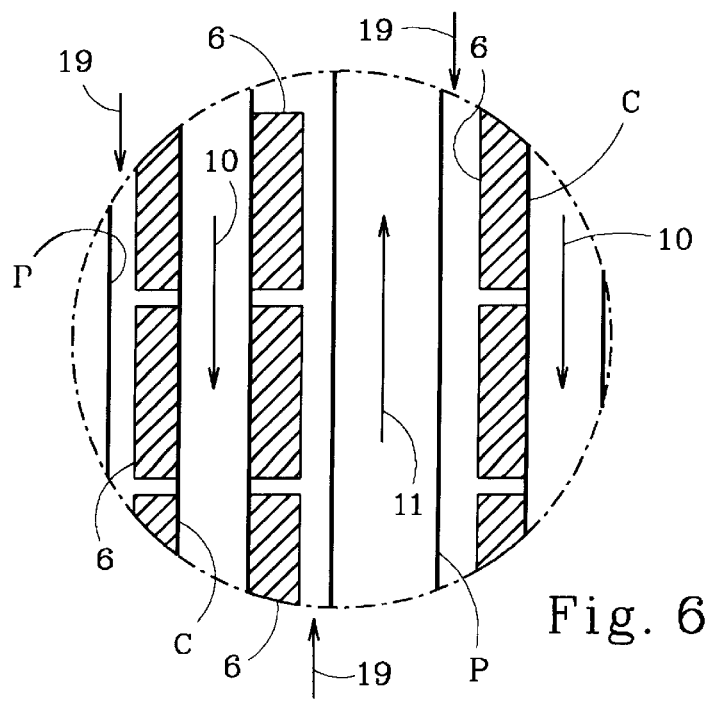
FIG. 6 is a schematic view illustrating the flowpaths of the substances in FIG. 5.

With reference now to FIGS. 3, 4, 5, and 6, and in particular FIG. 3, coolant flow 10 enters through isolation valve 30, travels through coolant inlet plenum 24, tubesheet 21, and cold plates C, and exits through coolant exit plenum 26. Likewise, heated flow 11 enters through a heated flow inlet plenum 22, travels through tubesheet 20 and emitter plates P, and exits through heated flow exit plenum 23. FIG. 6 illustrates a close-up view of the flow of the heated flow 11 through emitter plates P, and the flow of coolant 10 through cold plates C with affixed TV cells 6.

Within each emitter plate P, hot gas flows in U-shaped tubes 12, 13, 14, 15, 16, 17, and 18. Round tubes are most appropriate in a high pressure application, since they provide adequate pressure containment with a minimum thickness. The coolant flow 10 enters through the cold plates C in a similar manner, although round tubes are probably not needed since coolant need not be at high pressure.

Figure 4:
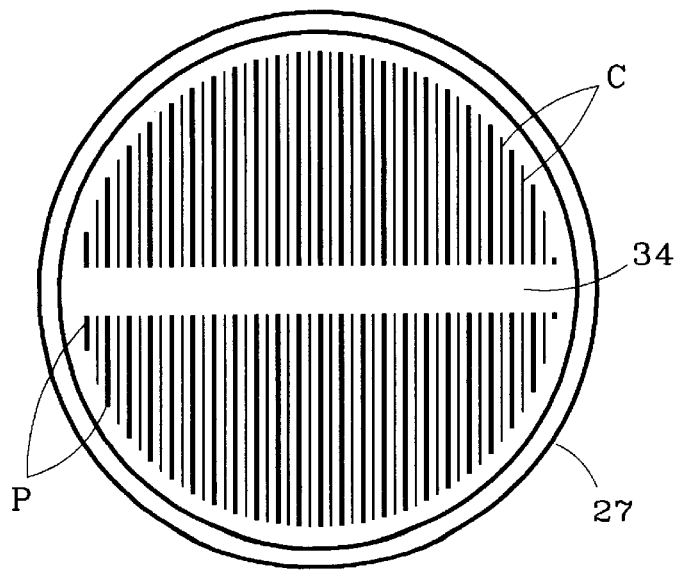
FIG. 4 is a cross-sectional view of the TV generator of FIG. 3 along line A–A[1]

Since the tubes in the emitter plates P are U-shaped, they form a divider lane 32 inside innermost tube 12, as illustrated in FIG. 2. Cold plates C, running in the opposite sense, also have a divider lane along their center line. These divider lane regions overlap, as illustrated in FIG. 4, and form a divider lane gap 34 which runs across the whole width of shell 27. The divider lane gap 34, which is approximately 6 inches wide by 1–3 feet long for a large scale application, allows a connection via brackets 25 of the emitter plates P to one another to increase their stiffness, as illustrated in FIG. 1. The divider lane gap 34 is also used for electrical wiring egress and access for maintenance.

In order to utilize the electrical energy converted by TV cells 6, electrical contacts (not shown) are attached to TV cells 6 to remove the energy.

Preliminary analysis of the disclosed invention has predicted adequate thermal and structural performance of the TV generator G. For a large scale application, the design of the TV generator G will have an energy production efficiency of over 20% and a power density in excess of 0.6 kilowatts per liter of heat transfer volume, assuming a high pressure heat source, such as provided by a power plant. Pressure stresses and bending stresses in the emitter plates are expected to be within the range of advanced high temperature material capabilities. Heated flow and coolant flow area can be adjusted to provide reasonable flowing pressure drops.

The disclosed generator assumes state of the art TV cells and spectral control. Advances in the state of the art in either area will improve performance but will not require significant redesign. One possible alternative to this design is to place the heated flow plenum in the center of the generator shell and feed the heated flow in both directions. Sets of coolant flow plenum would then be disposed at each end of the design. The advantage of this configuration is it reduces plate size but it also increases complexity and number of parts.

The invention is versatile in that it can be used for a wide range of power production needs. It can be used in a high pressure application to provide megawatts of electrical power for industrial applications. Alternatively, it could be used at low pressure, to minimize structural containment volume, for smaller scale applications.

While this invention has been described as having a preferred design, it is understood that it is capable of further modifications, uses, and/or adaptations of the invention and including such departures from the present disclosure as come within known or customary practice in the art to which the invention pertains, and as may be applied to the central features herein before set forth, and fall within the scope of the invention and the limits of the appended claims.

We claim:

1. A thermovoltaic power generator, comprising:
   a) a first tubesheet and a second tubesheet spaced apart from said first tubesheet;
   b) at least one photon emitter plate secured to and cantilevered off from said first tubesheet;
   c) at least one cold plate secured to and cantilevered off from said second tubesheet, said cold plate extending parallel to said photon emitter plate;
   d) a plurality of thermovoltaic cells, said cells disposed along oppositely disposed exterior surfaces of said cold plate; and
   e) vacuum maintaining means cooperating with said tubesheets for maintaining a vacuum between said photon emitter plate and said cold plate.

2. The generator according to claim 1, further comprising:
   a) a plurality of photon emitter plates secured to and cantilevered off from said first tubesheet; and
   b) a plurality of cold plates secured to and cantilevered off from said second tubesheet, extending parallel to said photon emitter plates, wherein said photon emitter plates and said cold plates are alternated.

3. The generator according to claim 2, wherein said photon emitter plates include at least one U-shaped tube for providing a heated flow through said photon emitter plates.

4. The generator according to claim 3, wherein said photon emitter plates include a plurality of U-shaped tubes to provide a heated flow through said photon emitter plates.

5. The generator according to claim 4, further comprising a first and second plenum adjacent said first tubesheet for entry and exit of a heated substance through said U-shaped tubes of said photon emitter plates.

6. The generator according to claim 4, wherein said U-shaped tubes are secured together by a support.

7. The generator according to claim 4, wherein said U-shaped tubes are circular in cross section.

8. The generator according to claim 4, wherein each of said cold plates includes at least one rectangular channel to provide cold fluid flow through each of said cold plates.

9. The generator according to claim 8, wherein each of said cold plates includes a plurality of said rectangular channels to provide cold fluid flow through each of said cold plates.

10. The generator according to claim 9, further comprising a first and second plenum adjacent said second tubesheet for entry and exit of a cold fluid through said rectangular channels.

11. The generator according to claim 9, wherein innermost tubes of said U-shaped tubes of said photon emitter plates and innermost channels of said rectangular channels of said cold plates define a divider lane.

12. The generator according to claim 2, further comprising a plurality of spacers secured to said cold plates to maintain spacing between said photon emitter plates and said cold plates.

13. The generator according to claim 12, wherein said spacers are located at a distal end of said cold plates proximate said first tubesheet.

14. The generator according to claim 1, wherein said vacuum maintaining means is a shell enclosing said first and second tubesheets.

15. The generator according to claim 1, further comprising:
   a) electrical leads contacting said thermovoltaic cells for removing electrical energy from said thermovoltaic cells.

16. The generator according to claim 1, further comprising:
   a) cooling means cooperating with said cold plate for cooling said cold plate; and
   b) heating means cooperating with said photon emitter plate for heating said photon emitter plate.

* * * * *